Feb. 20, 1934.   W. G. COREY   1,948,288
METHOD AND MEANS OF COUNTERBALANCING
Filed July 30, 1932

WILLIAM G. COREY
INVENTOR

BY James M. Abbott
ATTY.

Patented Feb. 20, 1934

1,948,288

UNITED STATES PATENT OFFICE 1,948,288

METHOD AND MEANS OF COUNTER-BALANCING

William G. Corey, Los Angeles, Calif.

Application July 30, 1932. Serial No. 626,313

9 Claims. (Cl. 74—14)

This invention relates to power transmission means, and particularly pertains to a method and means of counterbalancing rotary driving means for variable load reciprocating mechanisms.

In the operation of reciprocating mechanisms, such for example as pumping equipment used in elevating the liquid in wells, the load demands made on the power unit varies from maximum to minimum value at points throughout each complete pumping stroke cycle due to the fact that the torque required to rotate the crank shaft of the driving unit will reach a maximum when lifting the sucker rods of the pump, and the column of oil carried thereby, and will reach a minimum during the down stroke of the rods, since the weight of the falling rods at that time will furnish power tending to aid in the rotation of the crank shaft. Various devices have been designed and used in an attempt to reduce the driving torque required on the up stroke of the rods and to increase the driving torque required during the down stroke of the rods so as to cause the torque requirements to remain more nearly constant throughout the pumping cycle. These devices have included weights imposed upon the walking beam, or the other moving parts, and which weights reciprocate in a manner to move through one entire cycle during the time required for one complete revolution of the driving crank. It has been found, however, that while the use of such counterweights reduces the maximum torque value on the up stroke and increases the maximum torque value on the down stroke so that these values fall within a narrower range than is prevalent when counterweights are eliminated, this range in torque values from maximum to minimum may be further narrowed so that more nearly uniform torque requirements will exist throughout the pumping cycle.

It is the principal object of the present invention, therefore, to provide means acting in conjunction with the rotary power unit of a reciprocating pump mechanism whereby the maximum torque requirements of the crank furnishing the power to reciprocate the pump mechanism may be reduced to a minimum value and the torque requirement of the power plant throughout the pumping cycle may be kept more nearly constant than is at the present time obtainable with usual counterbalancing methods, thus making it possible to operate deep well pumps with relatively small prime movers, and thereby reducing the investment necessary in pumping equipment and at the same time obtaining the desirable results of reducing strain and impact stress on all of the equipment involved, which would tend to cause the pumping equipment to operate at substantially uniform speed, thus eliminating fatigue failures caused by variation in the stresses.

The present invention contemplates the provision of a power unit such, for example as an electric motor suitably geared to a rotating crank shaft carrying a crank connected to one end of a walking beam by a pitman rod. The other end of said walking beam being suitably connected to the sucker rods of a pump in a well. The walking beam being further provided with a counterweight of the conventional type which substantially counterbalances the weight of the sucker rods, plus part of the weight of the fluid column, while the crank shaft is provided with an auxiliary counterweight geared to it and adapted to operate in synchronism therewith but on a multiple cycle as compared with operation of the crank shaft whereby the auxiliary counterweight will aid the power unit in the period of maximum torque requirements of the pumping cycle and will absorb energy during the period of minimum torque requirements of the cycle after the well has been counterbalanced in the conventional manner.

The invention is illustrated by way of example in the accompanying drawing in which:—

Figure 1:
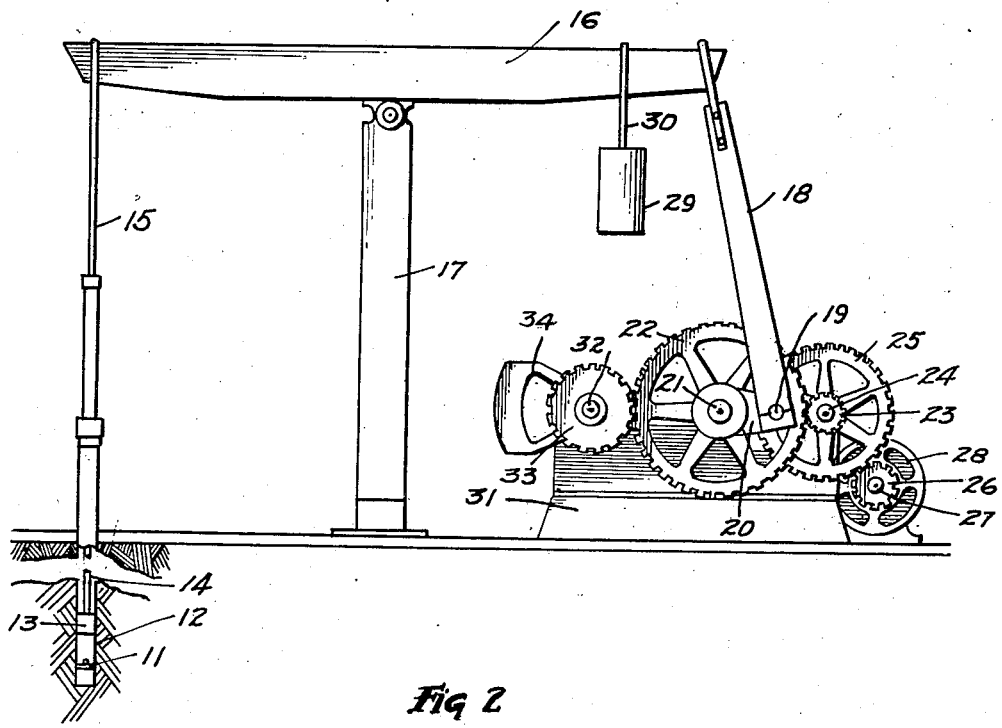
Figure 1 is a view in side elevation showing one application of the present invention to a deep well pump mechanism.

Referring more particularly to the drawing 10 indicates the casing of a well, here shown as fitted at its bottom with a standing valve 11 and a working barrel 12 within which a working valve 13 reciprocates. This valve is connected to sucker rods 14 which extend upwardly through the casing and are secured to a polish rod 15 connected to a walking beam 16. This walking beam is mounted upon a Samson post 17 and at its opposite free end is fitted with a pitman rod 18. The pitman rod 18 may be of any conventional design, and is here shown as being connected to a crank pin 19 carried by a radial crank arm 20, mounted upon a crank shaft 21. The crank shaft 21 is fitted with a gear 22 of relatively large diameter, here shown as meshing with a pinion 23 carried by a countershaft 24 and upon which shaft is mounted a gear 25 in mesh with driving pinion 26, here shown as mounted upon the armature shaft 27 of a motor 28. It is to be understood that other types of motive power may be used, such for example as internal combustion or steam engines. The walking beam may be counterbalanced in any conventional manner, although it is here shown that a counterbalance 29 of fixed value is suspended from the walking beam by a stirrup 30. This counterbalance might be applied to the pitman rod or crank if desired. The crank shaft 21 and the countershaft 24 are mounted within suitable bearings formed as a part of a base 31. This base also is provided with bearings to receive a counterweight shaft 32 fitted with a gear 33 in mesh with the crank shaft gear 22. The ratio between the gears 22 and 33 is in the proportion of 2 to 1.

Mounted upon the counterweight shaft 32 is an eccentric rotary counterweight 34 which under normal conditions of practice will lie along a radial axis extending oppositely from the axis of the crank shaft arm 20 thereof, and lying in the same horizontal plane when thus oppositely extending and rotating in the direction of arrow "a" in Fig. 1.

In analyzing the counterweight provisions of apparatus of the type here concerned, it will be recognized that any such counterweight or combination has limitations in approaching optimum conditions of constant power torque demand due to the fact that as the crank 20 passes top and bottom dead centers the torque power demand is at a minimum, and that when the crank 20 is at 90 degrees from the above-mentioned positions, the torque power demand is at a maximum. The most favorable value for counterweight when applied as above outlined exists when its value is equivalent to the weight of the entire sucker rod string plus one-half the weight of the fluid which is being lifted on the up stroke. When such a condition of balance exists the motor 28 will exert a certain maximum force on the up or pumping stroke necessary to lift one-half of the fluid load, the balance of lifting force necessary being obtained by the effect of the counterweight. On the down stroke of the sucker rod string the fluid load is supported by the working valve arrangement which releases the sucker rods of the weight of the fluid load and at this time the motor is required to exert force sufficient to lift that component part of the counterweight arrangement which has been provided to balance the half of the fluid load on the pumping stroke. Thus it has been found that the best counterbalance conditions exist when the average of the up stroke load and the down stroke load is substantially equal.

Figure 2:
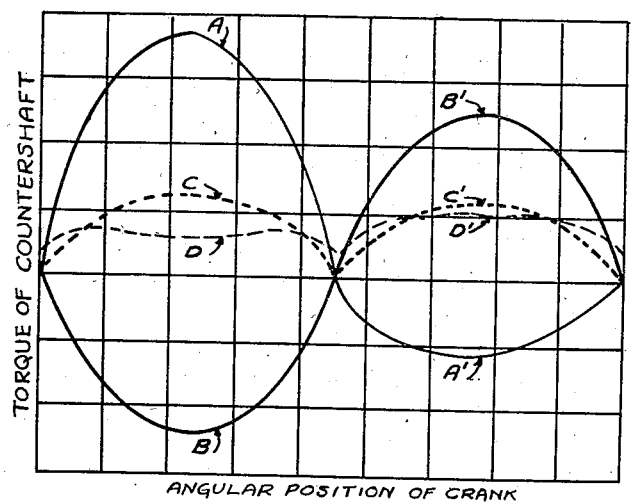
Fig. 2 is a view showing a torque graph of counterbalance curves.

In order to more clearly understand the conditions which exist by the use of conventional counterbalance methods, and conditions which are obtained by the use of the present invention, torque power curves are here presented as in Fig. 2 of the drawing. In these curves the graph diagram of power demand under the most favorable balancing conditions is represented by a series of equal approximate curves in which the horizontal axis represents angular travel of the crank and the vertical axis represents power demand. The normal curve of torque power demand of the polished rod load is indicated by the curve A—A' on this diagram. The vertical values represent torque on the crank shaft as foot pounds, and the horizontal values represent the angular position of the crank with the top and bottom positions at zero. The top vertical position of the crank 20 is indicated at zero degrees, and the up stroke of the pump and sucker rods is shown between zero degrees and 180°. The down stroke of the pump and sucker rods is shown between 180° and 360°. The various torque curves are representations of a well having polish rod loads of 15,000 foot pounds on the up stroke and 5,000 foot pounds on the down stroke.

It is to be noted that the vertical axis values are equal on the up and down strokes of the pumping equipment and are of the same sign. If no counterweights were used or unsuitable values for the same were used, the diagram would be a series of curves of unequal magnitude and signs indicating that the motor exerted peak load values during the pumping or up stroke, and a very much smaller load value on the down stroke, even to the extent of being driven by the unbalanced movements. The latter condition would be represented by power curves below the horizontal axis line shown in the diagram. The main counterbalance is indicated by the curve B—B'.

By referring to Fig. 2 a curve C—C' is indicated in two equal arcs. This is the resultant of forces indicated in torque curves A—A' and B—B' and represents the usual counterbalance effect by the use of fixed weights such as weight 29.

The purpose of providing the gears 22 and 33 which are in mesh and carry the rotating eccentric counterweight 34 is to more nearly equalize the motor load than is possible by the application of counterweights of conventional application. It will be recognized that by the use of counterweights as previously described, it is possible to reduce the motor load to two equal peak values and to two minimum load values of nearly zero during each pumping stroke cycle, and by the use of the gearing and rotating counterweight 34 the maximum load will be reduced one-fourth as compared with the same pumping equipment when operated without its influence. This condition is clearly illustrated in the diagram of Fig. 2, wherein a second series of curves indicated at D—D' representing the motor loads imposed by this device and here indicated as being charted upon the same axis as the motor load for the pumping load. By superimposing the series of curves C—C' and D—D' with due consideration of relative position of the counterweight to the crank arm and to relative rotating speeds of the crank arm to the counterweight, and with a proper assumption of the values for the tortional movement exerted by the rotating counterweight in relation to the motor load, the algebraic form of the vertical axis values will be such as to indicate a resulting power demand upon the motor that will have a reduction of approximately one-fourth of the fluctuation which would be present without the contributing influence of the rotary counterweight 34.

In order to obtain the foregoing desirable results the angular relationship of the crank 20 and the rotating counterweight 34 may be varied. It is generally found that the best relationship is obtained when the rotating counterweight 34 is set 90° behind the top vertical position of the crank arm 20 so that the rotating counterweight 34 must travel 90° in the normal direction of rotation before reaching the top vertical position. From the relative positions of the two weights 29 and 34 and the walking beam 16 throughout the pumping cycle, it is noted that the main weight 29 receives potential energy from the falling rods 14 during the down stroke of the rods, and gives this energy up during the up stroke of the rods, thus assisting the prime mover to lift the loads.

The auxiliary rotating counterweight 34 receives its potential energy during the first and last 45° of the up stroke of the rods, and the first and last 45° of the down stroke of the rods, and at a time when the torque requirements are at a minimum. The auxiliary rotating counterweight thus gives its energy up during the intermediate 90° of the up stroke, and the intermediate 90° of the down stroke to lift the sucker rods or the main counterweight as the case may be, when torque requirements are at a maximum.

The curve D—D' represents the resultant of the various torque and counterweight forces, and the net torque required to operate the pump when counterbalanced with a main counterbalance 29 and the auxiliary rotary counterbalance 34. It will thus be observed that with the auxiliary rotary counterbalance 34 in use, the maximum torque requirements are reduced to approximately 75 per cent of the maximum torque requirements under optimum conditions when any of the previously described single counterbalances are used, and it will be further noted that the minimum torque requirements are increased so that a substantially uniform torque power value exists throughout the pumping cycle.

It will thus be seen that the counterweight device here shown, while being decidedly simple in its construction and operation acts to effectively modify torque demands of a power unit in pumping operations, and to limit these demands to a relatively narrow range of variation whereby substantially uniform load will be maintained on the power unit and constant stress will be maintained on the component parts of the pump mechanism.

While I have shown the preferred form of my invention, as now known to me, it will be understood that various changes may be made in combination, construction, and arrangement of parts by those skilled in the art without departing from the spirit of my invention as claimed.

Having thus described my invention, what I claim and desire to secure by Letters Patent is:—

1. A method of counterbalancing an unbalanced reciprocating load which consists in providing constantly rotating drive means therefor, applying a fixed counterweight tending to offset the unbalanced reciprocating load and applying a rotary unbalanced counterweight geared to the driving means to rotate a plurality of turns to each rotation of the driving means and in synchronism therewith, whereby the torque power demand made upon the driving means by the reciprocating load will be substantially uniform.

2. A method of counterbalancing an unbalanced reciprocating load which load is moved by a reciprocating member reaching a point of inoperation at alternate extremes of its stroke and providing fixed counterweight means tending to counterbalance the unbalanced reciprocating load, then providing a constantly rotating power unit for driving the reciprocating means and gearing thereto an unbalanced rotary counterweight adapted to rotate twice as fast as the driving means to exert its stored energy during the periods at which the reciprocating means passes the alternate extremes of its stroke.

3. In combination with constantly rotating driving means, an unbalanced reciprocating load and means moving the same from said driving means, a fixed counterweight adapted to counterbalance the reciprocating load in its extreme unbalanced conditions, and a rotating counterweight driven from the driving means and in synchronism therewith and at a rate of speed of rotation greater than that of the driving means whereby to cooperate with the driving means at points in its cycle of operation to more nearly balance the reciprocating load than could be accomplished by the fixed counterweight alone.

4. In combination with a walking beam, a reciprocating deep well pump mechanism operatively connected to one end of the walking beam, a constantly rotating power unit adjacent the opposite end of the walking beam and provided with a crank shaft, a pitman rod connecting the power unit with the walking beam a fixed counterweight acting upon said walking beam during the times the pump mechanism imposes an unbalanced load thereon, and a movable unbalanced counterweight directly geared to the driving unit at a ratio of two revolutions of the unbalanced counterweight to one revolution of the driving unit in a manner to insure that its stored energy will act upon the driving mechanism during the periods between conditions of extreme unbalance of the walking beam and pump mechanism.

5. In combination with a walking beam, a deep well pump mechanism connected with one end thereof, a pitman rod connected with the opposite end thereof, constantly operating driving means for the pitman rod, a fixed counterweight carried by the walking beam and adapted to partially counterbalance the unbalanced load of the reciprocating pump mechanism, and a movable unbalanced auxiliary counterweight continuously driven from the power means at a ratio of two to one and moving in synchronism therewith to add further counterbalance to the power means during periods between conditions of extreme unbalance of the walking beam and pump mechanism.

6. In combination with a walking beam, a reciprocating deep well pump mechanism operatively connected to one end of the walking beam, a pitman rod operatively connected to the opposite end of the walking beam, a constantly operating power unit for said pitman rod, a crank shaft connected with the pitman rod and driven by the power unit, a fixed counterweight for the walking beam, an auxiliary shaft, an eccentric counterweight carried thereby and means for gearing the auxiliary shaft to the crank shaft to drive the unbalanced counterweight at a ratio of two revolutions of the unbalanced counterweight to one revolution of the crank shaft whereby the counterweight effect of the eccentric counterweight will be combined with the action of the fixed counterweight during periods between conditions of extreme unbalance of the walking beam and the pump mechanism.

7. In combination with a walking beam a reciprocating deep well pump mechanism connected to one end of the walking beam and adapted to lift a column of liquid in one direction of its movement, a pitman rod connected to the opposite end of the walking beam, a crank shaft the crank of which is pivotally connected with the pitman rod, means for driving the crank shaft, a gear carried on the crank shaft, a countershaft, an unbalanced counter-weight carried on the counter-shaft and a gear on the countershaft in mesh with the gear on the gear shaft and being half the pitch diameter thereof, said shafts being so set with relation to each other that the crank shaft and the unbalanced counterweight will simultaneously lie in the same plane when in the plane of their two shafts.

8. In combination with a walking beam a reciprocating deep well pump mechanism connected to one end of the walking beam and adapted to lift a column of liquid in one direction of its movement, a pitman rod connected to the opposite end of the walking beam, a crank shaft the crank of which is pivotally connected with the pitman rod, means for driving the crank shaft, a gear carried on the crank shaft, a counter-shaft, and unbalanced counter-weight carried on the counter-shaft and a gear on the counter-shaft in mesh with the gear on the gear shaft and being half the pitch diameter thereof, said shafts being so set with relation to each other that the crank shaft and the unbalanced counterweight will simultaneously lie in the same plane when in the plane of their two shafts, and a fixed counter-weight for the pump.

9. In combination with a reciprocating deep well mechanism, a horizontally disposed walking beam connected by one end therewith, a horizontally disposed crank shaft disposed at the opposite end of the walking beam, a crank throw on said shaft, a pitman rod connecting the crank throw with said adjacent end of the walking beam, a fixed counter-weight associated therewith tending to counterbalance the pump mechanism, power driving means for the crank shaft, a counter-shaft parallel to the crank shaft, both of said shafts lying in a substantially horizontal plane, an unbalanced counter-weight carried by the counter-shaft, a gear on the counter-shaft, a gear on the crank shaft in mesh with the gear on the counter-shaft and having twice the pitch diameter thereof, said shafts being so set with relation to each other as to insure that when the crank shaft throw and the counterweight extend oppositely from their respective shafts the crank shaft and counterweight will always assist the fixed counterbalance at maximum load points.

WILLIAM G. COREY.